Figure 3:
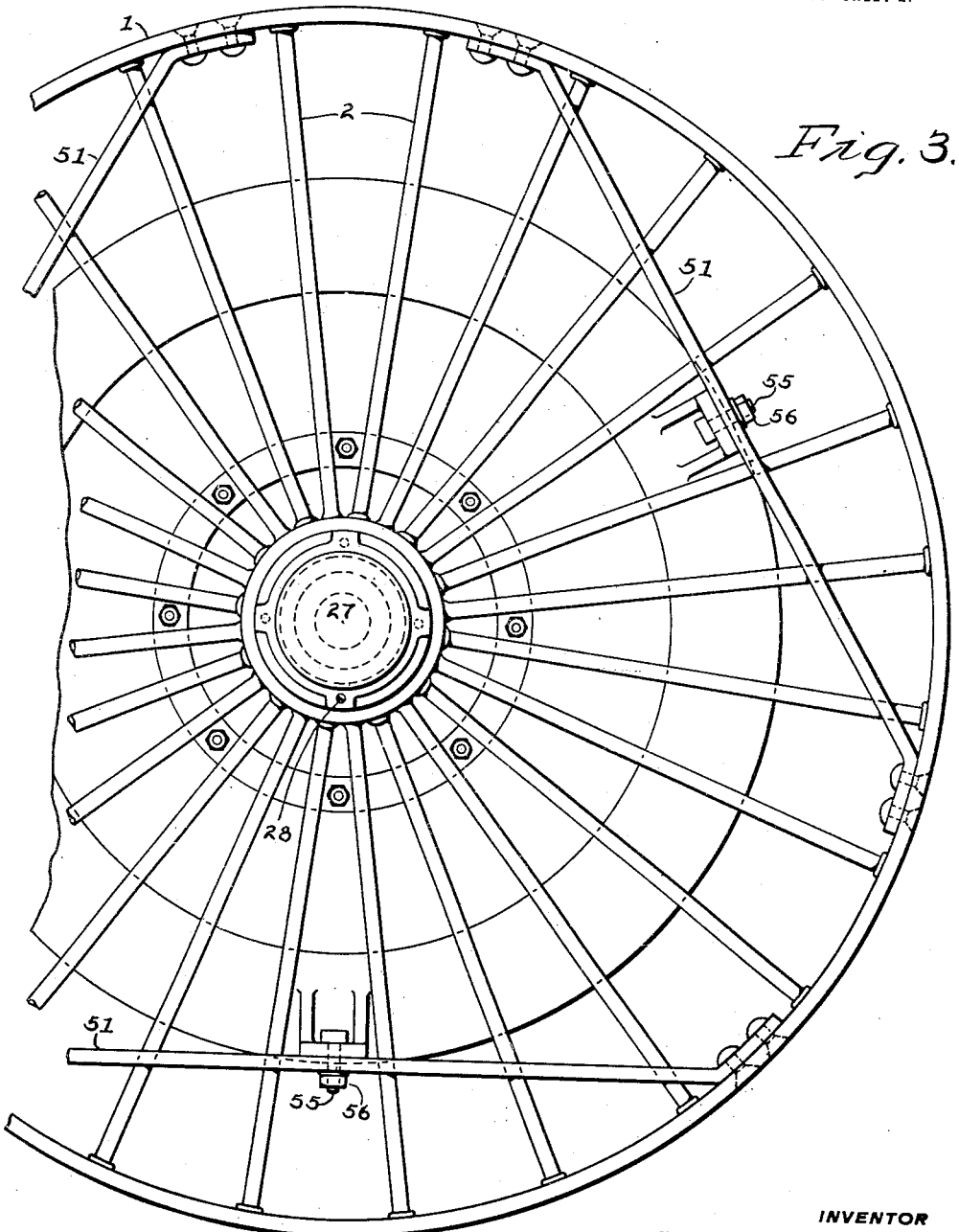

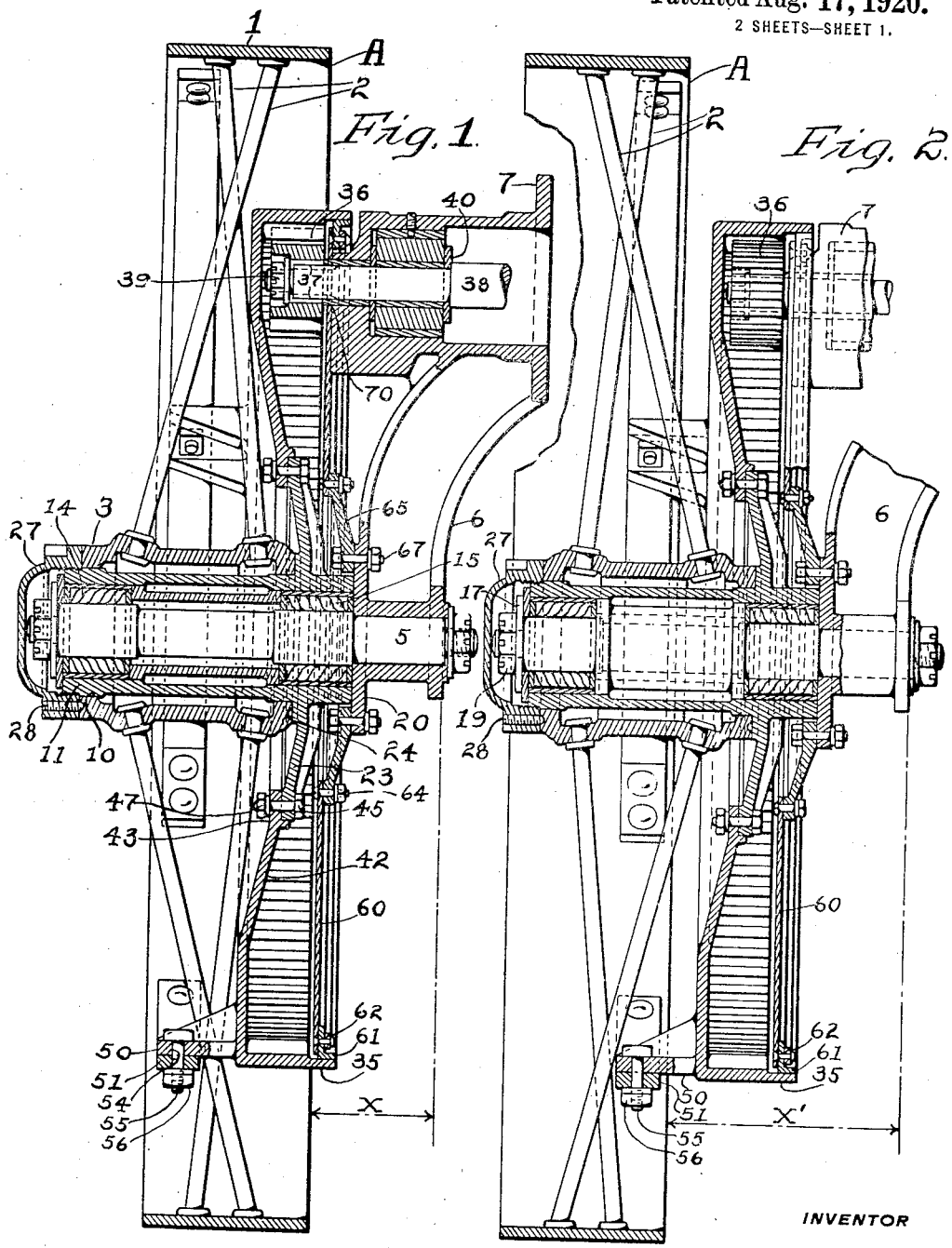

C. J. ALLEN.
SELF PROPELLED VEHICLE.
APPLICATION FILED JUNE 24, 1919.

1,349,997.

Patented Aug. 17, 1920.
2 SHEETS—SHEET 2.

INVENTOR
Charles J. Allen.

WITNESS

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

SELF-PROPELLED VEHICLE.

1,349,997.   Specification of Letters Patent.   Patented Aug. 17, 1920.

Application filed June 24, 1919. Serial No. 306,293.

*To all whom it may concern:*

Be it known that I, CHARLES J. ALLEN, a citizen of the United States, and a resident of Moorestown, county of Burlington, State of New Jersey, have invented certain new and useful Improvements in Self-Propelled Vehicles, of which the following is a specification, reference being had to the accompanying drawings.

My invention relates more particularly to that class of self-propelled vehicles in which power is applied directly to the driving wheels by means of gearing, or in any other suitable manner, a principal object of the invention being to provide means whereby the tread or distance between wheels of the vehicle may be readily increased or decreased as desired, the invention being especially applicable to self-propelled vehicles such as tractors utilized in farming, and for other analogous purposes, in which it is frequently desirable to alter width of the tread of the vehicle in order to secure the most satisfactory results from the operation of the machine.

Other objects of the invention are to provide means whereby the tread or distance between the wheels of a self-propelled vehicle may be increased or diminished within limits without deranging, dismounting or otherwise altering the axles or other portions of the vehicle on which the wheels thereof are operatively supported, or the means whereby the power is supplied to the wheels, and to provide means adapted for this purpose which are extremely simple both in construction and in method of operation and which may be readily understood and conveniently operated by persons who are not experienced mechanics without danger of injuring the parts or of erroneously assembling or disassembling them during the operation of varying the width of the tread.

My invention further includes all of the other various novel objects and features of construction and arrangement hereinafter more definitely specified and described.

In the accompanying drawing in which is illustrated one embodiment of my invention showing the same in a form adapted for employment in a farm tractor, although it will, of course, be understood that the invention may be used with equal facility on other forms of self-propelled vehicles, Figure 1 is a central vertical section of one of the wheels of a tractor and its supporting members constructed in accordance with the said form of my invention, the parts being shown in one of the positions in which they may be adjusted for operation; Fig. 2 is a similar view, partially fragmentary, showing the parts in another operatively adjusted position, and Fig. 3 is a fragmentary side elevation of the embodiment of the invention shown in Figs. 1 and 2.

Referring now to that form of the invention shown in the drawings, the same may comprise a suitable, preferably metallic, wheel A, having a felly 1 and spokes 2 secured to the felly at their outer extremities, and at their inner extremities to a cylindrical hub 3, in any suitable manner, as will be well understood by those familiar with the art. The hub of the wheel surrounds and is supported on a suitable stationary stub axle 5 rigidly secured at is inner end to a depending bracket 6 preferably provided with a flange 7 whereby the bracket may be secured to the frame or other suitable portion, such as the transmission housing, of the vehicle (not shown,) the method of securing the bracket to the vehicle, as well as the bracket itself, forming no part of this invention. It is to be understood that, if desired, the bracket in certain constructions may be entirely omitted and the axle 5 supported in any other suitable and convenient manner.

The interior of the hub is machined to provide the preferably cylindrical surfaces 10 which form a sliding fit upon the exterior of a sleeve 11 which surrounds the axle, and which may be supported on suitable, preferably anti-friction, bearings, as for example, roller bearings 14 and 15, in a manner which will be readily understood by those familiar with the art. The bearings may be of any suitable type, or if desired, the same may be omitted entirely and the sleeve arranged to rotate directly upon the axle without the interposition of any anti-friction bearings whatsoever. The sleeve is prevented from longitudinal movement relative to the axle by any suitable means, as, for example, and as is shown in the drawings, by one or more washers 17 adjacent the outer end of the sleeve maintained in place on the axle by a castellated nut 19 threaded onto the outer end of the axle, which may, for this purpose, be conveniently reduced in size. The inner end of the sleeve is operative to engage bracket 6 which may preferably be provided with a circular flange 20 adjacent the end of the sleeve, against which the sleeve abuts when in position on the axle. The sleeve may preferably be provided with an outwardly extending, circumferential flange 23 preferably somewhat dished toward its center, the outer face of which adjacent the sleeve is preferably faced off to provide a surface 24 against which the inner end of hub 3 is adapted to abut, and for the purpose of operatively maintaining the hub in engagement, or substantial engagement, with surface 24, suitable means are provided which may conveniently comprise a hub cap 27, internally threaded, and operatively secured upon the externally threaded outer end of sleeve 11, which is preferably made sufficiently long to extend beyond the outer face of the hub and afford room for the reception of the hub cap. A suitable set screw 28, or the like, may be provided to prevent the hub cap from backing off after it has been adjusted in position against hub 3.

For the purpose of supplying motive power to the wheel to revolve the same and thereby propel the vehicle over the ground, suitable means are provided, which may preferably comprise an internal gear secured in operative relation with the wheel and actuated by a pinion driven from the source of motive power employed in the vehicle. In the form of the invention shown in the drawings, the means employed to accomplish this result comprise a large ring gear 35 provided with suitable teeth on its inner periphery for engagement with and actuation by a pinion 36 suitably rigidly secured, as by keys 37, to a shaft 38, and prevented from longitudinal movement on the shaft by any convenient means, such as a nut 39 threaded on to the reduced end portion thereof. The shaft 38 is supported in a suitable bushing 40 which may in turn be conveniently supported by the bracket 6, the shaft being arranged to extend inwardly through a hollow portion of said bracket and being connected with any suitable source of power (not shown), by which the vehicle is propelled and which, as well as the means of supporting the shaft, form no part of my invention.

The ring gear 35 is provided with an inwardly extending flange 42 slightly dished toward its center adapted to engage with, and be removably supported by the flange 23 of sleeve 11 in any suitable way, a convenient method of accomplishing this result being to provide flange 42 with an annular shoulder 43 adapted to surround the periphery of flange 23 whereby the ring gear may be conveniently centered on the latter, in which position it may be secured by a plurality of bolts 45 extending through both flanges and provided with nuts 47.

It will be seen that with the parts constructed and arranged as hereinbefore described, the rotation of shaft 38 and corresponding rotation of pinion 36 will cause rotation of ring gear 35 and in turn of sleeve 11, and for positively effecting the corresponding rotation of the wheel A, means of any suitable form and construction are provided for operatively, yet removably, connecting the ring gear and the wheel, so that the wheel will turn unitarily with the sleeve and the ring gear. In the form of the invention herein described such means may conveniently comprise a plurality of integral brackets 50 extending outwardly from the ring gear and adapted to engage, and be removably secured to, a plurality of suitable members or driving bars 51 preferably rigidly secured to the felly of the wheel in such manner that the longitudinal axes of the respective bars substantially form chords of the circle bounded by the inner face of the felly. For conveniently removably securing brackets 50 to bars 51, both the brackets and the bars may be provided with suitable bolt holes 54 positioned so that the hole in each bracket will register with the hole in its adjacent bar to permit bolts 55 to be passed through the holes to receive nuts 56 and thereby operatively secure the bars and brackets together.

It will be noted that bars 51 are arranged so that the axes of the bolt holes 54 are not equidistant from the sides of the felly 1, but that the bars are offset in such manner that the said axes are considerably closer to one side of the felly than to the other. Thus, with the parts in the position shown in Fig. 1 in which the bars are more nearly adjacent that side of the felly nearest the hub cap, or as it might be termed, the outermost side of the felly, the ring gear 35 will be largely positioned within the wheel itself, and the distance from the inner side of the felly to a fixed portion of the vehicle, for example, the inner face of the bracket 6, may conveniently be represented by the symbol X.

If it be desired to increase the width of the tread of the vehicle, this result may be readily brought about by removing hub cap 27, the vehicle being conveniently supported so that the weight thereof is removed from axle 5, withdrawing nuts 56 and bolts 55 and sliding a wheel A outwardly off sleeve 11, then reversing the wheel and replacing it on the sleeve together with the hub cap, and again securing it in operative relation with ring gear 35 by means of bolts 55 and nuts 56 so that the parts will assume the position shown in Fig. 2. In this position, owing to the reversal of the wheel A, as aforesaid, the distance X', that is, the distance from the inner face of the wheel to that part of the vehicle to which distance X was measured, will be increased over the distance X by an amount equal to twice the amount that the axes of the bolt holes 54 are offset from a plane equidistant from the sides of the felly of the wheel, and the width of the tread of the vehicle therefore increased by a corresponding amount.

For the purpose of inclosing the teeth on ring gear 35 and pinion 36, and protecting the same from accumulations of dust and other foreign matter, as well as retaining a lubricant within the ring gear, suitable means are provided, which may conveniently comprise a circular plate 60 of sheet metal slightly less in diameter than the internal diameter of the open end of the ring gear, and having a ring 61 of felt or other suitable material, secured adjacent the periphery of the plate in such a way that the material will normally extend for a slight distance beyond the plate. A convenient method of securing ring 61 in position is to provide a metal ring or washer 62 of slightly less external diameter than plate 60, and rivet or otherwise secure it to plate 60 on the outside of ring 61, the rivets passing through plate 60, ring 61 and washer 62, but, if desired, any other convenient means for holding ring 61 in position may be employed. The plate 60 may be conveniently removably supported, as by bolts 64, upon a disk-shaped flange 65 which may be bolted, as by bolts 67, or otherwise conveniently maintained, upon flange 20 of bracket 6, a suitable opening 70 being provided in plate 60 for the passage of shaft 38.

It will be understood that when the parts are assembled plate 60 is attached to its supporting member 65 prior to the time when pinion 36 is positioned on shaft 38, and that thereafter ring gear 35, bolted to flange 23, is slid longitudinally into place. During the latter part of this movement, the open end of the ring gear will engage the felt or other material 61 which, being of a somewhat greater diameter than the internal diameter of the ring gear, is turned upwardly and outwardly to assume substantially the position shown in the drawings when sleeve 11 is seated against flange 20 thereby closing the opening between the periphery of plate 60 and the ring gear against the entrance of dust and other foreign matter, the ring gear being free to revolve relatively to the plate and in contact with ring 61.

It is thought that from the foregoing description, the construction and operation of the invention will be clearly understood, and that it will be apparent that the wheel A may be readily reversed with relation to the axle or other fixed portion of the vehicle to widen or decrease the width of the tread of the vehicle as may be desired, without any alteration or disturbance of the fixed parts of the vehicle or of the ring gear, driving pinion or dust guard, by merely removing the hub cap, nuts 56 and bolts 55, reversing the wheel A from the position shown in Fig. 1 to that shown in Fig. 2 to widen the tread of the vehicle, or vice versa to decrease the tread thereof, and replacing the hub cap, bolts and nuts. It will further be understood that while I have illustrated but a single wheel in conjunction with one form of bracket through the medium of which the wheel is supported with relation to the frame or other portion of the vehicle, in practice, the vehicle will generally be supplied with two or more wheels arranged on opposite sides thereof and that in such case both wheels may, if desired, be reversed in order to increase or decrease the width of the tread to the greatest possible extent, or that only one wheel may be reversed, thereby effecting an increase or decrease in the width of the tread equal to one-half of the maximum variation possible.

Furthermore, while I have shown and described one embodiment of my invention in a form suitable for employment in a farm tractor, or other substantially similar vehicle, I do not thereby intend or desire to limit myself solely to the employment of the invention in self-propelled vehicles of this nature, for the invention may be as readily employed in other forms of self-propelled vehicles as well, nor do I intend or desire to limit myself to the specific form of the invention which I have shown and described, as numerous changes and modifications may be made therein to adapt the invention to the varying conditions encountered in practice without departing from the spirit and scope of the invention as defined in the appended claims.

Having thus described my invention, I claim and desire to protect by Letters Patent of the United States:

1. In a self-propelled vehicle, the combination of a stationarily supported axle, a sleeve surrounding said axle and rotatable relative thereto, a gear in operatively fixed relation with said sleeve, means for rotating said gear, a wheel having a plurality of chord-like members operatively connected to said gear, and means whereby the operative position of said members may be reversed with respect to said gear and said axle to vary the width of the tread of said vehicle.

2. In a self-propelled vehicle, the combination of a stationary axle, a spoked wheel removably rotatably mounted on said axle, means comprising a gear for driving said wheel, and means disposed transversely to the spokes of said vehicle connecting said driving means and said wheel whereby said wheel may be operatively mounted on said axle in a plurality of positions to vary the width of the tread of the vehicle.

3. In a self-propelled vehicle, the combination of a stationarily supported axle, a sleeve surrounding said axle and rotatable with respect thereto, a spoked wheel operatively carried on said sleeve, means for driving said wheel, and means disposed transversely to the spokes of said wheel connecting said driving means and said wheel whereby said wheel may be operatively mounted on said sleeve in a plurality of positions to vary the width of the tread of said vehicle.

4. In a self-propelled vehicle, the combination of a wheel, non-rotatable wheel supporting means, wheel driving means having a plurality of brackets, a plurality of members secured to said wheel disposed in chord-like relation thereto and offset from a plane equidistant from the faces thereof, and means whereby said brackets and said members may be operatively connected.

5. In a self-propelled vehicle, the combination of a wheel having a plurality of members respectively disposed normal to a radius thereof rigidly secured thereto and offset from a plane equidistant from the faces thereof, of wheel supporting means comprising an axle, means operative to drive said wheel, and means for operatively connecting said driving means and said members in a plurality of different relative positions.

6. In a self-propelled vehicle, the combination of a stationarily supported axle, a sleeve rotatable with respect to said axle, a ring gear rotatable with said sleeve and having a plurality of outwardly extending brackets, means for driving said ring gear, a wheel removably mounted on said sleeve and having a plurality of members so positioned that their longitudinal axes form chords with respect to said wheel and offset from a plane equidistant from the faces of said wheel, and means for operatively removably connecting said brackets and said members.

In witness whereof I have hereunto set my hand this 19th day of June, A. D. 1919.

CHARLES J. ALLEN.

Witness:
CHARLES C. EMIGH.